(12) United States Patent
Freeman (10) Patent No.: US 11,514,251 B2
(45) Date of Patent: Nov. 29, 2022

(54) DETECTING ANOMALIES IN TEXTUAL ITEMS USING CROSS-ENTROPIES

(71) Applicant: Verint Americas Inc., Alpharetta, GA (US)

(72) Inventor: Cynthia Freeman, Albuquerque, NM (US)

(73) Assignee: Verint Americas Inc., Alpharetta, GA (US)

( * ) Notice: Subject to any disclaimer, the term of this patent is extended or adjusted under 35 U.S.C. 154(b) by 7 days.

(21) Appl. No.: 16/903,916

(22) Filed: Jun. 17, 2020

(65) Prior Publication Data

US 2020/0401768 A1 Dec. 24, 2020

Related U.S. Application Data

(60) Provisional application No. 63/014,775, filed on Apr. 24, 2020, provisional application No. 62/984,425, filed on Mar. 3, 2020, provisional application No. 62/862,958, filed on Jun. 18, 2019.

(51) Int. Cl.
*G06F 40/47* (2020.01)
*G06F 40/279* (2020.01)

(52) U.S. Cl.
CPC .......... *G06F 40/47* (2020.01); *G06F 40/279* (2020.01)

(58) Field of Classification Search
CPC ...... G06F 40/47; G06F 40/279; G06F 40/216; G06F 40/30
USPC .......................................................... 704/9
See application file for complete search history.

(56) References Cited

U.S. PATENT DOCUMENTS

| | | | |
|---|---|---|---|
| 6,772,120 B1 * | 8/2004 | Moreno | G06F 40/216 704/9 |
| 9,256,663 B2 * | 2/2016 | Bhatia | G06F 16/285 |
| 9,407,651 B2 * | 8/2016 | Mathis | H04L 41/145 |
| 9,411,800 B2 * | 8/2016 | Morin | G06F 40/274 |
| 9,729,727 B1 * | 8/2017 | Zhang | G06N 20/10 |

(Continued)

FOREIGN PATENT DOCUMENTS

| | | |
|---|---|---|
| EP | 3623964 | 3/2020 |
| KR | 1020180081444 | 7/2018 |

(Continued)

OTHER PUBLICATIONS

Adams, R., et al., "Bayesian Online Changepoint Detection," arXiv preprint arXiv:0710.3742, 2007, 7 pages.

(Continued)

*Primary Examiner* — Edwin S Leland, III
(74) *Attorney, Agent, or Firm* — Meunier Carlin & Curfman LLC (57) ABSTRACT

In an implementation, a method for detecting anomalies in textual items is provided. The method includes: receiving a first plurality of textual items by a computing device; training a language model using the received first plurality of textual items by the computing device; after training the language model, receiving a second plurality of textual items by the computing device; calculating a cross-entropy for each textual item in the second plurality of textual items by the computing device using the language model; and detecting an anomaly in at least one of the textual items of the second plurality of textual items by the computing device using the calculated cross-entropies.

15 Claims, 6 Drawing Sheets

(56) References Cited

U.S. PATENT DOCUMENTS

| | | | |
|---|---|---|---|
| 10,607,604 B2* | 3/2020 | Itoh | G10L 15/02 |
| 10,896,472 B1* | 1/2021 | Stack | G06Q 10/0635 |
| 11,222,627 B1* | 1/2022 | Qian | G09B 19/06 |
| 2007/0299798 A1* | 12/2007 | Suyama | G06F 17/18 706/21 |
| 2008/0052259 A1* | 2/2008 | Shiftman | G06N 5/02 706/47 |
| 2009/0192781 A1* | 7/2009 | Bangalore | G06F 40/45 704/2 |
| 2012/0109651 A1* | 5/2012 | Chen | G06F 16/313 707/E17.049 |
| 2012/0127540 A1* | 5/2012 | Moore | H04N 1/00957 358/474 |
| 2012/0136703 A1* | 5/2012 | Stewart | G06Q 30/0214 705/14.16 |
| 2012/0136704 A1 | 5/2012 | Carlson et al. | |
| 2012/0143860 A1* | 6/2012 | Gherman | G06F 16/951 707/727 |
| 2012/0254333 A1* | 10/2012 | Chandramouli | G06F 40/10 709/206 |
| 2013/0018650 A1* | 1/2013 | Moore | G06F 40/44 704/9 |
| 2013/0046531 A1* | 2/2013 | Chandramouli | G06F 40/216 704/9 |
| 2013/0138428 A1* | 5/2013 | Chandramouli | G06F 40/30 704/9 |
| 2013/0246386 A1* | 9/2013 | Gherman | G06F 16/951 707/750 |
| 2014/0222476 A1* | 8/2014 | Romano | G06Q 10/063 705/7.11 |
| 2014/0280621 A1* | 9/2014 | Bourdaillet | G06Q 50/01 709/206 |
| 2015/0047026 A1* | 2/2015 | Neil | H04L 63/1433 726/22 |
| 2016/0117466 A1* | 4/2016 | Singh | G06Q 50/265 702/19 |
| 2016/0170996 A1* | 6/2016 | Frank | G06F 16/24578 707/748 |
| 2017/0294192 A1* | 10/2017 | Bradley | G10L 25/51 |
| 2018/0018686 A1* | 1/2018 | Wood | G06Q 30/0204 |
| 2018/0048661 A1* | 2/2018 | Bird | G06F 21/00 |
| 2018/0091539 A1* | 3/2018 | Marquardt | G06F 7/5443 |
| 2018/0113782 A1* | 4/2018 | Valacich | G06F 16/958 |
| 2018/0174600 A1* | 6/2018 | Chaudhuri | H04N 21/4666 |
| 2018/0217749 A1* | 8/2018 | Alsharif | G06F 3/0237 |
| 2018/0316704 A1* | 11/2018 | Joseph Durairaj | H04L 41/142 |
| 2018/0373991 A1* | 12/2018 | Rosenberg | G06N 5/041 |
| 2019/0188741 A1* | 6/2019 | Wood | G06N 5/003 |
| 2019/0236139 A1* | 8/2019 | DeFelice | G06F 40/56 |
| 2019/0236148 A1* | 8/2019 | DeFelice | G06N 3/0472 |
| 2019/0304470 A1* | 10/2019 | Ghaemmaghami | G10L 17/06 |
| 2020/0160229 A1* | 5/2020 | Atcheson | G06N 20/00 |
| 2020/0286469 A1* | 9/2020 | Freeman | G06N 3/0445 |
| 2020/0401768 A1* | 12/2020 | Freeman | G06F 40/216 |
| 2022/0180061 A1* | 6/2022 | Kim | G06F 40/35 |
| 2022/0189599 A1* | 6/2022 | Petch | G16H 40/20 |

FOREIGN PATENT DOCUMENTS

| | | |
|---|---|---|
| WO | 2007/005975 | 1/2007 |
| WO | 2018/128403 | 7/2018 |
| WO | 2019/060327 | 3/2019 |

OTHER PUBLICATIONS

Ahmad, S., et al., "Unsupervised real-time anomaly detection for streaming data," Neurocomputing, vol. 262, 2017, pp. 134-147.

Aktolga, E., et al., "Detecting Outlier Sections in US Congressional Legislation," Proceedings of the 34th International ACM SIGIR Conference on Research and Development in Information Retrieval, 2011, pp. 235-244.

Allen, L., et al., "On Twitter Purge: A Retrospective Analysis of Suspended Users," Association for the Advancement of Artificial Intelligence, 2020, 8 pages.

"Anomaly Detection: Numenta Anomaly Benchmark," Machine Intelligence Technology, 2017, 7 pages.

Banerjee, A., et al., "Anomaly Detection: A Tutorial," SIAM Conference on Data Mining, 2008, 103 pages.

Brownlee, J., "How to Check if Time Series Data is Stationary with Python," retrieved on Dec. 13, 2019 at https://machinelearningmastery.com/time-series-data-stationary-python, 2016, 51 pages.

Buck, C., et al., "N-gram Counts and Language Models from the Common Crawl," Proceedings of the 9th International Conference on Language Resources and Evaluation (LREC), 2014, pp. 3579-3584.

Chandola, V., et al., "Anomaly Detection: A Survey," ACM Computing Surveys, vol. 41, No. 3, Article 15, 2009, 58 pages.

Chen, Y-C, et al., "Event Detection using Customer Care Calls," Proceedings of the IEEE International Conference on Computer Communications (INFOCOM), 2013, pp. 1690-1698.

Cheung, Y.-W., et al., "Lag Order and Critical Values of the Augmented Dickey-Fuller Test," Journal of Business & Economic Statistics, vol. 13, No. 3, 1995, pp. 277-280.

Choudhary, S., et al., "Sparse Decomposition for Time Series Forecasting and Anomaly Detection," Proceedings of the SIAM International Conference on Data Mining, 2018, pp. 522-530.

Cleveland, R.B., et al., "STL: A Seasonal-Trend Decomposition Procedure Based on Loess," Journal of Official Statistics, vol. 6, No. 1, 1990, pp. 3-73.

Danescu-Niculescu-Mizil, C., et al., "No Country for Old Members: User Lifecycle and Linguistic Change in Online Communities," Proceedings of the 22nd International Conference on World Wide Web, 2013, pp. 307-318.

"datastream.io," Mentat Innovations, retrieved on Jan. 6, 2020 from https://blog.ment.at/datastream-io-4863db728667, 2017, 2 pages.

Forsyth, E., et al., "The NPS Chat Corpus," retrieved on Apr. 21, 2020 at http://facultynps.edu/cmartell/NPSChat.htm, 2019, 2 pages.

Freeman, C., et al., "Experimental Comparison of Online Anomaly Detection Algorithms," The 32nd International Florida Artificial Intelligence Research Society Conference (Flairs-32), 2019, pp. 364-369.

Fulton, C., "Estimating time series models by state space methods in Python: Statsmodels," http://www.chadfulton.com/fuiton_statsmodels, 2017, 78 pages.

Grave, E., et al., "Unbounded cache model for online language modeling with open vocabulary," 31st Conference on Neural Information Processing Systems (NIPS), 2017, pp. 6042-6052.

Guthrie, D., et al., "An Unsupervised Approach for the Detection of Outliers in Corpora," Statistics, 2008, pp. 3409-3413.

Guthrie, D., "Unsupervised Detection of Anomalous Text," Thesis, 2008, 186 pages.

Hawkins, J., et al., "Hierarchical Temporal Memory including HTM Cortical Learning Algorithms," Numenta, 2011, 68 pages.

Herath, J.D., et al., "RAMP: Real-Time Anomaly Detection in Scientific Workflows," IEEE International Conference on Big Data (Big Data), 2019, pp. 1367-1374.

Hochenbaum, J., et al., "Automatic Anomaly Detection in the Cloud Via Statistical Learning," arXiv preprint arXiv:1704.07706, 2017, 13 pages.

Hodge, V., et al., "A Survey of Outlier Detection Methodologies," Artificial Intelligence Review, vol. 22, No. 2, 2004, pp. 85-126.

Hyndman, R. J., "Anomalous time-series R Package," retrieved on Nov. 5, 2020 from https://github.com/robjhyndman/anomalous, 2018, 3 pages.

Hyndman, R. J., et al., "Automatic Time Series Forecasting: The forecast Package for R," Journal of Statistical Software, vol. 27, Issue 3, 2008, 22 pages.

Inouye, D., et al., "A Review of Multivariate Distributions for Count Data Derived from the Poisson Distribution," Computational Statistics, vol. 9, No. 3, 2017, 40 pages.

Isbister, T., "Anomaly detection on social media using ARIMA models," Thesis, Uppsala Universitet, 2015, 38 pages.

Jain, S., et al., "Characterizing and Detecting Livestreaming Chatbots," IEEE/ACM International Conference on Advances in Social Networks Analysis and Mining, 2019, pp. 683-690.

(56) References Cited

OTHER PUBLICATIONS

Jiang, N., "Perplexity Vs Cross-entropy," retrieved on Oct. 2, 2020 from https://jiangnanhugo.gilhub.io/2016/perplexity-vs-cross-entropy, 2016, 3 pages.

Jozefowicz, R., et al., "Exploring the Limits of Language Modeling," arXiv preprint, 2016, 11 pages.

Kannan, R., et al., "Outlier Detection for Text Data," 15th Proceedings of the 2017 SIAM International Conference on Data Mining, 2017, pp. 489-497.

Kelly, S., et al., "Propagating Disaster Warnings on Social and Digital Media," International Conference on Pervasive Computing, 2015, pp. 475-484.

Kenter, T., et al., "Short Text Similarity with Word Embeddings," Proceedings of the $24^{th}$ ACM International Conference on Information and Knowledge Management, 2015, pp. 1411-1420.

Keogh, E., et al., "HOT SAX: Efficiently Finding the Most Unusual Time Series Subsequence," The $5^{th}$ IEEE International Conference on Data Mining (ICDM), 2005, pp. 440-449.

Keshvani, A., "How to use the Autocorreation Function (ACF)?," https://coolstatsblog.com/2013/08/07/how-to-use-the-autucorrection-function-acf, 2013, 2 pages.

Kowalska, K., et al., "Maritime Anomaly Detection using Gaussian Process Active Learning," IEEE $15^{th}$ International Conference on Information Fusion, 2012, pp. 1164-1171.

Kulick, J., "Bayesian change-point detection," https://github.com/hildensia/bayesian_changepoint_detection, 2016, 1 page.

Laptev, N., et al., "Generic and Scalable Framework for Automated Time-series Anomaly Detection," Proceedings of the 21th ACM SIGKDD International Conference on Knowledge Discovery and Data Mining, 2015, pp. 1939-1947.

Lata, L., et al., "A Comprehensive Survey of Fraud Detection Techniques," International Journal of Applied Information Systems, vol. 10, No. 2, 2015, pp. 26-32.

Lavin, A., et al., "Evaluating Real-time Anomaly Detection Algorithms—the Numenta Anomaly Benchmark," IEEE 14th International Conference on Machine Learning and Applications (ICMLA), 2015, pp. 38-44.

Lili, C., "Research of E-commerce Supply Chain Management with CreditRisk + model," International Conference on Management of e-Commerce and e-Government, 2012, 3 pages.

Linden, M., "Testing Growth Convergence with Time Series Data—a non-parametric approach," International Review of Applied Economics, vol. 14, Issue 3, 2000, pp. 361-370.

Liu, S., et al., "Online Conditional Outlier Detection in Nonstationary Time Series," Proceedings of the International Florida AI Research Society Conference. Florida AI Research Symposium, HHS Public Access, 2017, 15 pages.

Liu, D., et al., "Opprentice: Towards Practical and Automatic Anomaly Detection Through Machine Learning," Proceedings of the 2015 Internet Measurement Conference (ACM), 2015, pp. 211-224.

Lowe, R., et al., "The Ubuntu Dialogue Corpus: A Large Data Set for Research in Unstructured Multi-Turn Dialogue Systems," Proceedings of the SIGDIAL 2015 Conference, 2015, pp. 285-294.

"Luminol," LinkedIn, retrieved on Nov. 5, 2020 from https://github.com/linkedin/luminol, 2018, 9 pages.

Madrid, F., et al., "Efficient and Effective Labeling of Massive Entomological Datasets," IEEE International Conference on Data Science and Advanced Analytics (DSAA), 2019, 9 pages.

Makinen, M. S., "Deep Learning for Anomaly Detection in Linux System Log," Thesis, Aalto University School of Science, 2019, 61 pages.

"Media Bias Fact Check," NowThis News, retrieved on Apr. 21, 2020 at https://mediabiasfactcheck.com/nowthis-news/, 2019, 5 pages.

Morgan, A., et al., "Anomalyzer: Probabilistic anomaly detection for time series data," Lytics, retrieved on Nov. 4, 2020 from https://github.com/lytics/anomalyzer, 2015, 4 pages.

Mueen, A., et al., "The Fastest Similarity Search Algorithm for Time Series Subsequences under Euclidean Distance and Correlation Coefficient," retrieved on May 27, 2020 at http://www.cs.unm.edu/~mueen/FastestSimilaritySearch.html, 2017, 3 pages.

"NAB: The Numenta Anomaly Benchmark," retrieved on Apr. 24, 2020 at https://github.com/numenta/NAB, 2018, 5 pages.

Norvig, P., "How to Write a Spelling Corrector," retrieved on May 27, 2020 at https://norvig.com/spell-correct.html, 2007, 10 pages.

Phua, C., et al., A Comprehensive Survey of Data Mining-based Fraud Detection Research, arXiv preprint arXiv:1009.6119, 2010, 14 pages.

Prusher, I, "Parkland Mourns. Tragedy Strikes a Florida Community," Time, 2018, 7 pages.

Robertson, S., et al., "The Probabilistic Relevance Framework: BM25 and Beyond," Foundations and Trends in Information Retrieval, vol. 3, No. 4, 2009, pp. 333-389.

Rodriguez, J., "Poisson Models for Count Data," Acesso, vol. 10, No. 2, 2007, 14 pages.

Salvatier, J., et al., "Probabilistic Programming in Python using PyMC3," PeerJ Computer Science, 2016, 20 pages.

Saurav, S., et al., "Online Anomaly Detection with Concept Drift Adaptation using Recurrent Neural Networks," Proceedings of the ACM India Joint International Conference on Data Science Management of Data, 2018, pp. 78-87.

Savage, D., et al., "Anomaly Detection in Online Social Networks," Social Networks, vol. 39, No. 1, 2014, pp. 62-70.

Schreiber, J, "Pomegranate: fast and flexible probabilistic modeling in python," The Journal of Machine Learning Research, vol. 18, No. 1, 2017, pp. 5992-5997.

Seabold, S., et al., "Statsmodels: Econometric and Statistical Modeling with Python," Proceedings of the $9^{th}$ Python in Science Conference (SCIPY), 2010, 57 pages.

Shaoul, C., et al., A reduced redundancy USENET corpus (2005-2011), Westbury Lab Web Site, retrieved on Apr. 21, 2020 at http://www.psych.ualberta.ca/~westburylab/downloads/usenetcorpus.download.html, 2013, 2 pages.

Singh, N., et al., "Demystifying Numenta Anomaly Benchmark," IEEE International Joint Conference on Neural Networks (IJCNN), 2017, pp. 1570-1577.

"Skyline," Etsy, retrieved on Nov. 5, 2020 from https://github.com/etsy/skyline, 2015, 5 pages.

Sordoni, A., et al., "A Neural Network Approach to Context-Sensitive Generation of Conversational Responses," arXiv:1506.06714v1, 2015, 11 pages.

Steyn, H. "On the multivariate poisson normal distribution," Journal of the American Statistical Association, vol. 71, No. 353, 1976, pp. 233-236.

"Surus," Netflix, retrieved on Nov. 5, 2020 from https://github.com/Netflix/Surus, 2015, 3 pages.

Tatbul, N., et al., "Precision and Recall for Time Series," $32^{nd}$ Conference on Neural Information Processing Systems (NeurIPS), 2018, 11 pages.

Taylor, S., et al., "Forecasting at Scale," PeerJ Preprints, 2017, pp. 37-45.

Vallis, O., et al., "A Novel Technique for Long-Term Anomaly Detection in the Cloud," HotCloud, 2014, 6 pages.

Wang, Z., et al. "Automatic Model Selection for Anomaly Detection," IEEE Computer Society, TrustCom-BigDataSE-ISPA, 2016, pp. 276-283.

Xia, Y., et al., "NIL is Not Nothing: Recognition of Chinese Network Informal Language Expressions," Proceedings of the $4^{th}$ SIGHAN Workshop on Chinese Language Processing, 2005, 8 pages.

Yamanishi, K., et al., "On-line Unsupervised Outlier Detection Using Finite Mixtures with Discounting Learning Algorithms," Data Mining and Knowledge Discovery, vol. 8, No. 3, 2004, pp. 275-300.

Zhu, L., et al., "Deep and Confident Prediction for Time Series at Uber," IEEE International Conference on Data Mining Workshops (ICDMW), 2017, 8 pages.

Zhuang, H., et al., "Identifying Semantically Deviating Outlier Documents," Proceedings of the 2017 Conference on Empirical Methods in Natural Language Processing, 2017, pp. 2748-2757.

(56) References Cited

OTHER PUBLICATIONS

International Search Report and Written Opinion, dated Sep. 24, 2020, received in connection with corresponding International Patent Application No. PCT/US2020/038169.

Freeman, C., et al., "Human-in-the-Loop Selection of Optimal Time Series Anomaly Detection Methods," $7^{th}$ AAAI Conference on Human Computation and Crowdsourcing (HCOMP), 2019, 3 pages.

* cited by examiner

FIG. 6

DETECTING ANOMALIES IN TEXTUAL ITEMS USING CROSS-ENTROPIES

CROSS-REFERENCE TO RELATED APPLICATIONS

This application claims the benefit of priority to U.S. Provisional Patent Application No. 62/862,958, filed on Jun. 18, 2019, entitled "USING CROSS-ENTROPIES FROM CRAWLING LANGUAGE MODELS TO DETECT ANOMALIES." This application further claims the benefit of priority to U.S. Provisional Patent Application No. 62/984,425, filed on Mar. 3, 2020, entitled "USING CROSS-ENTROPIES FROM CRAWLING LANGUAGE MODELS TO DETECT ANOMALIES." This application further claims the benefit of priority to U.S. Provisional Patent Application No. 63/014,775, filed on Apr. 24, 2020, entitled "HUMAN-IN-THE-LOOP SEQUENTIAL ANOMALY DETECTION OF SHORT TEXTUAL ITEMS." The contents of all three applications are hereby incorporated by reference in their entirety.

BACKGROUND

An anomaly in a textual item is a word or phrase that is appearing with a frequency that is greater than expected frequency according to a language model. Anomaly detection can be used for a variety of purposes such as determining the intent of a conversation, or for determining when to escalate a customer agent interaction in a call center.

Anomalies in textual items are typically detected using a count model or a snapshot model. Unfortunately, there can be a disconnect between what is considered an anomaly by the count model and what is considered an anomaly via a snapshot language model. For example, consider agent conversations with customers in a call center. Suppose that on average, the number of times the "gift certificates" intent is hit per hour of call time is 10, but during a particular hour, it reaches 30. This would most likely trigger a count based anomaly detection model. However, if the text of the conversations that triggered the intent are further analyzed, it may be the case that the hits are all "expected". For example, all 30 texts could be some variation of "I need a gift certificate." The snapshot language model could be used to rank these 30 texts, but none of the cross-entropy values would be very high, meaning that the text is not surprising given the past linguistic state.

As another example, suppose on hour y there are 10 texts (which is not unusual, count-wise). But one of those texts is "You guys are not helping! My gift certificate is not working!! You guys are idiots". The snapshot language model would probably return a high cross-entropy value, but the count based model would not trigger an anomaly alert as the counts are not unusual. Thus, it is still necessary to consider both the count model and snapshot language model to detect anomalies.

SUMMARY

In an implementation, a method for detecting anomalies in textual items is provided. The method includes: receiving a first plurality of textual items by a computing device; training a language model using the received first plurality of textual items by the computing device; after training the language model, receiving a second plurality of textual items by the computing device; calculating a cross-entropy for each textual item in the second plurality of textual items by the computing device using the language model; and detecting an anomaly in at least one of the textual items of the second plurality of textual items by the computing device using the calculated cross-entropies.

Implementations may have some or all of the following features. The method may further include: determining that a number of textual items in the second plurality of textual items exceeds a threshold; and in response to the determination, sliding the language model forward using the second plurality of textual items. The method may further include: determining that an amount of time has passed since the language was last slid forward exceeds a threshold; and in response to the determination, sliding the language model forward using the second plurality of textual items. The textual item may include a plurality of words. Calculating the cross-entropy for each textual item in the second plurality of textual items may include calculating the cross-entropy using a subset of the plurality of words of the textual item. Calculating the cross-entropy for each textual item in the second plurality of textual items may include calculating an average cross-entropy for each textual item in the second plurality of textual items. The textual item may include a call transcript between an agent and a customer, a chat transcript between the agent and the customer, or messages in a social networking application. The method may further include: receiving a list of textual items that were determined not to be associated with anomalies; for each textual item of the second plurality of textual items: determining if the textual item is in the list of textual items; and if the textual item is in the list of textual items, reducing the calculated cross-entropy for the textual item. Determining if the textual item is in the list of textual items may include determining if the textual item is similar to a textual item in the list of textual items.

In an implementation, a method for detecting anomalies in textual items is provided. The method includes: receiving a first plurality of textual items by a computing device; training a language model using the received first plurality of textual items by the computing device; after training the language model, receiving a second plurality of textual items by the computing device; for each textual item of the second plurality of content items: calculating a cross-entropy for the textual item using the language model by the computing device; calculating a perplexity of the language model by the computing device; and if the calculated perplexity exceeds a threshold, sliding the language model forward using a subset of the textual items of the second plurality by the computing device; and detecting an anomaly in at least one textual item of the second plurality of textual items by the computing device using the calculated cross-entropies.

Implementations may include some or all of the following features. A textual item may include a plurality of words. Calculating the cross-entropy for the textual item may include calculating the cross-entropy using a subset of the plurality of words of the textual item. Calculating the cross-entropy for the textual item may include calculating an average cross-entropy. The textual item may include a call transcript between an agent and a customer, a chat transcript between the agent and the customer, or messages in a social networking application. The method may further include: receiving a list of textual items that were determined not to be associated with anomalies; for each textual item of the second plurality of textual items: determining if the textual item is in the list of textual items; and if the textual item is in the list of textual items, reducing the calculated cross-entropy for the textual item. Determining if the textual item is in the list of textual items comprises determining if the textual item is similar to a textual item in the list of textual items.

In an implementation, a system for detecting anomalies in textual items is provided. The system may include a least one processor; and a memory storing instructions that when executed by the at least one processor cause the at least one processor to: receive a first plurality of textual items; train a language model using the received first plurality of textual items; after training the language model, receive a second plurality of textual items; calculate a cross-entropy for each textual item in the second plurality of textual items using the language model; and detect an anomaly in at least one of the textual items of the second plurality of textual items using the calculated cross-entropies.

Implementations may include some or all of the following features. The instructions may further include instructions that when executed by the at least one processor cause the at least one processor to: determine that a number of textual items in the second plurality of textual items exceeds a threshold; and in response to the determination, slide the language model forward using the second plurality of textual items. The instructions may further include instructions that when executed by the at least one processor cause the at least one processor to: determine that an amount of time has passed since the language was last slid forward exceeds a threshold; and in response to the determination, slide the language model forward using the second plurality of textual items.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
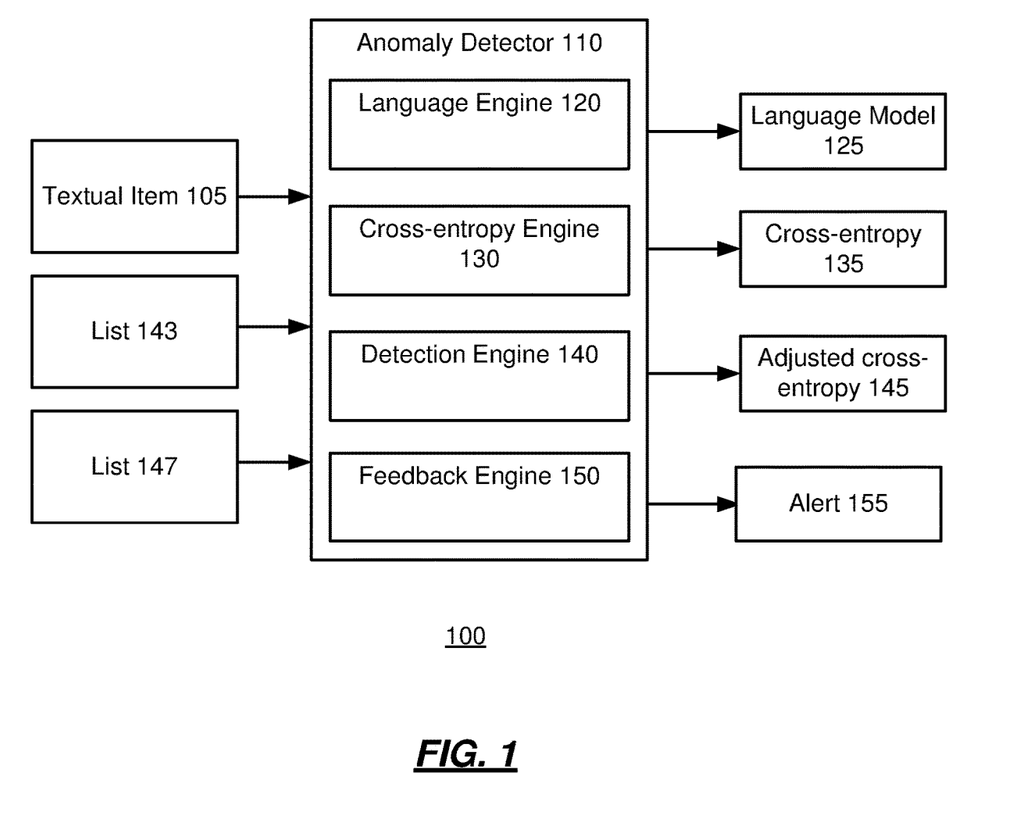
FIG. 1 is an illustration of an environment for detecting anomalies in textual items.

FIG. 1 is an illustration of an environment 100 for detecting anomalies in textual items. As shown, the environment 100 includes an anomaly detector 110 that is made up of several components including but not limited to a language engine 120, a cross-entropy engine 130, a detection engine 140, and a feedback engine 150. More or fewer components may be supported. The various components of the anomaly detector 110 may be implemented together or separately using one or more computing devices such as the computing device 600 illustrated with respect to FIG. 6.

The anomaly detector 110 may be configured to detect anomalies in textual items 105. A textual item 105 is a set of words such as a sentence or a paragraph. Textual items 105 may correspond to spoken sentences from a transcript between two or more parties, written sentences from an online chat between two or more parties, or a series of email, SMS, or social networking messages (e.g., tweets) exchanged between two or more parties. Other textual items 105 may be supported. In one embodiment, the textual items 105 may include words and phrases exchanged between customers and agents in a call center.

A time series of textual items 105 is a time ordered sequence of textual items 105. A time series of textual items 105 may correspond to a particular conversation or exchange between an agent and customer in a call center, for example.

Generally speaking, an anomaly in a textual item 105 or time series may be a word or phrase that appears in the textual item 105 (or time series) that is greater than a probability that is predicted by a language model 125. A language model 125 is a probability distribution over sequences of symbols pertaining to a language. Each language model 125 may correspond to a different type of textual item 105 and may be trained using the distributions of words found in that particular type of textual item 105.

For example, a language model 125 trained on textual items 105 such as movie reviews would assign a higher probability to the word sequence "I think the movie is great" than the word sequence "The term Bayesian refers to Thomas Bayes, who proved a special case of what is now called Bayes' theorem". Conversely, a language model 125 trained on textual items such as mathematical texts would assign higher probability to the later word sequence than the former word sequence.

Language models 125 can be parametric or nonparametric. Parametric approaches include deep learning techniques but require large quantities of data and often cannot adapt to rapid changes in the distribution of the data in an online setting. Nonparametric approaches include count-based techniques (statistics on N-grams). Although they tend to perform worse compared to parametric approaches, nonparametric approaches can efficiently incorporate new information and require significantly less data.

The quality of a language model 125 is evaluated using perplexity. For bigrams, the perplexity of a word W of length N is defined in the following equation (1) as:

$$\left(\prod_{i=1}^{N} \frac{1}{P(\omega_i \mid \omega_{i-1})}\right)^{1/N}$$

The lower the perplexity the better. As described further below, the language model 125 can slide (e.g., be updated), when the perplexity increases past a threshold, or when the number of textual items 105 received since the language model 125 was last updated exceeds a threshold.

The language engine 120 may build a language model 125 for a particular application using a training set of textual items 105. The textual items 105 in the training set may be of a same type of textual item 105 that the language model 125 will be used to detect anomalies for. For example, if the language model 125 will be used to detect anomalies in calls between agents and customer, the textual items 105 may be transcripts of calls. As another example, if the language model 125 will be used to detect anomalies in social networking posts, the textual items 105 may be tweets of other messages. Any method for training a language model 125 may be used. The number of textual items 105 may be selected by a user or administrator.

The cross-entropy engine 130 may calculate the cross-entropy 135 for a textual item 105 (i.e., a textual item 105 not used to train the language model 125) using the language model 125. The cross-entropy 135 for a textual item 105 may be a measure of how unlikely the particular textual item 105 is given the associated language model 125.

The cross-entropy engine 130 may calculate the cross-entropy 135 for a textual item 105 p using the following equation (2) where $p_j$ is a plurality of n-grams that make up p, N is the number n-grams that make up p, LM is the language model 125, and $P_{LM}(p_j)$ is the probability of the n-gram $p_j$ under the LM:

$$H(p, LM) = -\frac{1}{N}\sum_j \log(P_{LM}(p_j))$$

The higher H(p,LM) is, the more surprising the textual item p is given the recent past linguistic state. The lower H(p,LM) is the less surprising. In other words, a low H(p,LM) means that p reflects what is commonly seen in the past. Also, note that the cross-entropy 135 will naturally get larger the bigger p is (in terms of number of words). Accordingly, in some embodiments, the cross-entropy engine 130 may consider only the first c words of p (i.e., the textual item 105) when calculating the cross-entropy 135. The value of c may be set by a user or administrator.

The cross-entropy engine 130 may calculate the cross-entropies 135 for a time-series of textual items 105 using two different algorithms. The first algorithm is referred to herein as the fixed size crawling language model and the second algorithm is referred to herein as the adaptive size crawling model.

In the fixed size crawling model, the cross-entropy engine 130 may receive a set of textual items 105. The set of textual items 105 may be a time series of textual items 105. The textual items 105 may be different than the textual items 105 using to train the language model 125.

The cross-entropy engine 130 may calculate the cross-entropy 135 for each textual item 105 in the set of textual items 105 according to the time order. After computing the cross-entropy 135 for a textual item 105, the cross-entropy engine 130 may determine whether a threshold number of cross-entropies 135 have been computed since the language model 125 was last trained or slid (i.e., updated or re-trained). If so, the cross-entropy engine 130 may slide the language model 125 using the textual items 105 processed by the cross-entropy engine 130 up until that point and may return the cross-entropies 145 generated for the textual items 105. Else, the cross-entropy engine 130 may continue to process textual items as described above. Depending on the embodiment, rather than return a cross-entropy 135 for each of the textual items 105 in the set or time-series, the cross-entropy engine 130 may return the average cross-entropy 135.

In the adaptive size crawling model, the cross-entropy engine 130 may similarly calculate the cross-entropy 135 for each textual item 105 in the set of textual items 105 according to the time order. However, rather than consider the number of textual items 105 that are processed before determining to slide the language model 125, after computing the cross-entropy 135 for a textual item 105, the cross-entropy engine 130 may calculate the perplexity of the language model 125 given the textual items 105 that have been processed so far. If the perplexity is above a threshold perplexity, the cross-entropy engine 130 may slide the language model 125 using the textual items 105 processed by the cross-entropy engine 130 up until that point and may return the cross-entropies 135 generated for the textual items 105.

If the perplexity is not above the threshold perplexity, the cross-entropy engine 130 may continue to process textual items 105 as described above until the calculated perplexity exceeds the threshold perplexity. Depending on the embodiment, rather than return a cross-entropy 135 for each of the textual items 105 in the set or time-series, the cross-entropy engine 130 may return the average cross-entropy 135.

When calculating the perplexity of the language model 125, it is likely that the trained language model 125 will encounter unseen words or bigrams which can cause a 0 to appear in the denominator in the perplexity equation (1) shown above. One possibility for the unseen word may be a spelling error. For example, a user might spell "certificate" as "certifcate". Accordingly, when encountering an unknown word, the cross-entropy engine 130 may first employ a spelling corrector which chooses the most likely spelling correction for a word w given a list of candidates. If the word or bigram is still unseen by the language model 125 after the spelling correction, the cross-entropy engine 130 may interpolate the probability distribution using 1/|v| where v is the set of all words in the language model 125. Any method for correcting the spelling of an unknown word may be used.

The detection engine 140 may be configured to detect an anomaly in a textual item 105, and to generate an alert 155 in response to the detection. In some embodiments, the detection engine 140 may detect an anomaly for a textual item 105 when the cross-entropy for the textual item 105 exceeds a threshold cross-entropy 135. The threshold may be set by a user or administrator. Alternatively, or additionally, the detection engine 140 may detect an anomaly when the cross-entropy 135 of the textual item 105 exceeds one or more confidence intervals of a Gaussian Process model. Other methods may be used.

The detection engine 140 may generate an alert 155 in response to detecting an anomaly. Depending on the embodiment, the alert 155 may be a message that is sent to a user or an administrator when an anomaly is detected. The alert 155 may indicate the particular textual item 105 associated with the anomaly.

The feedback engine 150 may allow feedback from annotators (e.g., users or administrators) with respect to detected anomalies to be incorporated into the cross-entropies 135 generated for textual items 105. In some implementations, when an annotator disagrees with a particular detected anomy in an alert 155, the annotator may provide feedback to the feedback engine 150. The feedback engine 150 may then add the textual item 105 to a list 143 of textual items 105. As described further below, the list 143 may be used by the feedback engine 150 to reduce the cross-entropies 135 of textual items 105 that match textual items 105 in the list 143 to generate adjusted cross-entropies 145.

In some embodiments, the feedback engine 140 may determine that a textual item 105 matches a textual item 105 in the list 143 if the textual item 105 is semantically similar to a textual item 105 in the list 143. The semantic similarity of two textual items 105 may be determined using the following equation (3) where $s_l$ is the longer textual item 105, $s_s$ is the shorter textual item 105, $avg_{sl}$ is the average sentence length in the language model 125, $sem(\omega, s_s) = \max_{\omega' \in s_s} cosinee(\omega, \omega')$, and b and $k_l$ are smoothing factors:

$$f_{sts}(s_l, s_s) = \sum_{\omega \in s_s} IDF(\omega) * \frac{sem(\omega, s_l) * (k_1 + 1)}{sem(\omega, s_l) + k_1 * \left(1 - b + b * \frac{s_s}{avg_{sl}}\right)}$$

In some embodiments, the feedback engine 150 may be incorporated into the adaptive size crawling module algorithm as follows. When the perplexity threshold is reached for a time series of textual items 105, the detection engine 140 may detect anomalies in the textual items 105 based on the cross-entropies 135, and the detected anomalies (and associated textual items 105) may be provided to an annotator for annotation. Every textual item 105 that is annotated to not be associated with an anomaly by the annotator may be added to the list 143 along with a list of $f_{sts}$ values for the textual item 105 that was disagreed on and every new textual item 105 that is received by the anomaly detector 110.

The list of $f_{sts}$ values may then be used by the feedback engine 150 to perform an additional anomaly detection that uses a windowed gaussian method where the mean and variance of the of the $f_{sts}$ values are computed using a sliding window. When the value from $f_{sts}$ for a textual item 105 indicates that the textual item 105 is similar to textual item 105 on the list 143, the feedback engine 150 may reduce the computed cross-entropy 135 of the textual item 105 to generate an adjusted cross-entropy 145, thereby reducing the likelihood that the textual item 105 will be associated with an anomaly.

In some embodiments, the feedback engine 150 may consider the similarity of a textual item 105 to previously processed or analyzed textual items 105 when determining if a textual item 105 is an anomaly. Depending on the embodiment, the feedback engine 150, in addition to the list 143, may maintain a list 147 of textual items 105 that the annotators agreed were related to anomalies. When a textual item 105 is received, the feedback engine 150 may determine if the textual item 105 is similar to a textual item 105 on the list 143 or a textual item 105 on the list 147. If the textual item 105 is similar to a textual item 105 on the list 143, then it is likely that it is not associated with an anomaly, and its cross-entropy 135 may be reduced. Conversely, if the textual item 105 is similar to a textual item 105 on the list 147, then it is likely that it is associated with an anomaly, and its cross-entropy 135 may be increased.

Alternatively, any textual item 105 that is similar to a textual item 105 on the list 143 may be presumed to be not associated with an anomaly regardless of its cross-entropy 135, and any textual item 105 that is similar to a textual item 105 on the list 147 may be presumed to be associated with an anomaly regardless of its cross-entropy 135. Two textual items 105 may be considered to be similar when the value of $f_{sts}$ for the textual items 105 is less than a threshold value, for example.

The anomaly detector 110 described herein may be used for the following example applications. In one example, the anomaly detector 110 may be used to detect anomalies in conversations between customers and an Intelligent Virtual Assistant (IVA) for an airline. The language engine 120 may train an adaptive size crawling language model 125 with a perplexity threshold of 1000 and an initial training set of 500 conversations (i.e., textual items 105) taken from real customer interactions with the IVA. After processing 100 conversations, the cross-entropy engine 130 may determine that the perplexity threshold is reached and may slide the language model 125 forward. The resulting language model 125 may include the cross-entropies 135 of every conversation from the training set. Because the textual items 105 generated by the IVA and customers may be irregularly sampled time series, a Gaussian Process may be used by the detection engine 140 to trigger an anomaly when the cross-entropy 135 exceeds the confidence intervals of a corresponding Gaussian Process model. Textual items 105 corresponding to these cross-entropy anomalies are "surprising" relative to the past linguistic state and contain phrases such as "cannot log in" or "is your site down?", suggesting that something may have happened on the corresponding airline website, making it difficult for users to log into their accounts. The IVA may use the crawling language model 125 to determine the intent of a conversation between a customer and the IVA, and may formulate and return a response to the conversation based on the determined intent.

In another example, an IVA may be trained to provide support for airline customers. A previous IVA using a parametric model would detect an anomaly when a textual item 105 is received that includes text related to a small less frequently used airport such as "Spokane Airport" even where no anomaly should be detected. However, a non-parametric model (as used by the anomaly detector 110) can correctly handle these types of less frequent textual items 105. The language engine 120 may train a fixed size language model 125 with an initial training size of 100 actual conversations (i.e., textual items 105) between customers and the IVA. After every 30 conversations are processed, the cross-entropy engine 130 may slide the language model 125 forward. After the language model 125 has been trained, the cross-entropies 135 can be obtained for every conversation. A time step size of 1 hour may be selected and linear interpolation may be used to create a regularly sampled time series from the textual items 105. The detection engine 140 may then identify the textual items 105 from the sampled time series that have unusually high cross-entropies 135. This may avoid erroneously detecting infrequent phases such as "Spokane Airport" as anomalies.

Figure 2:
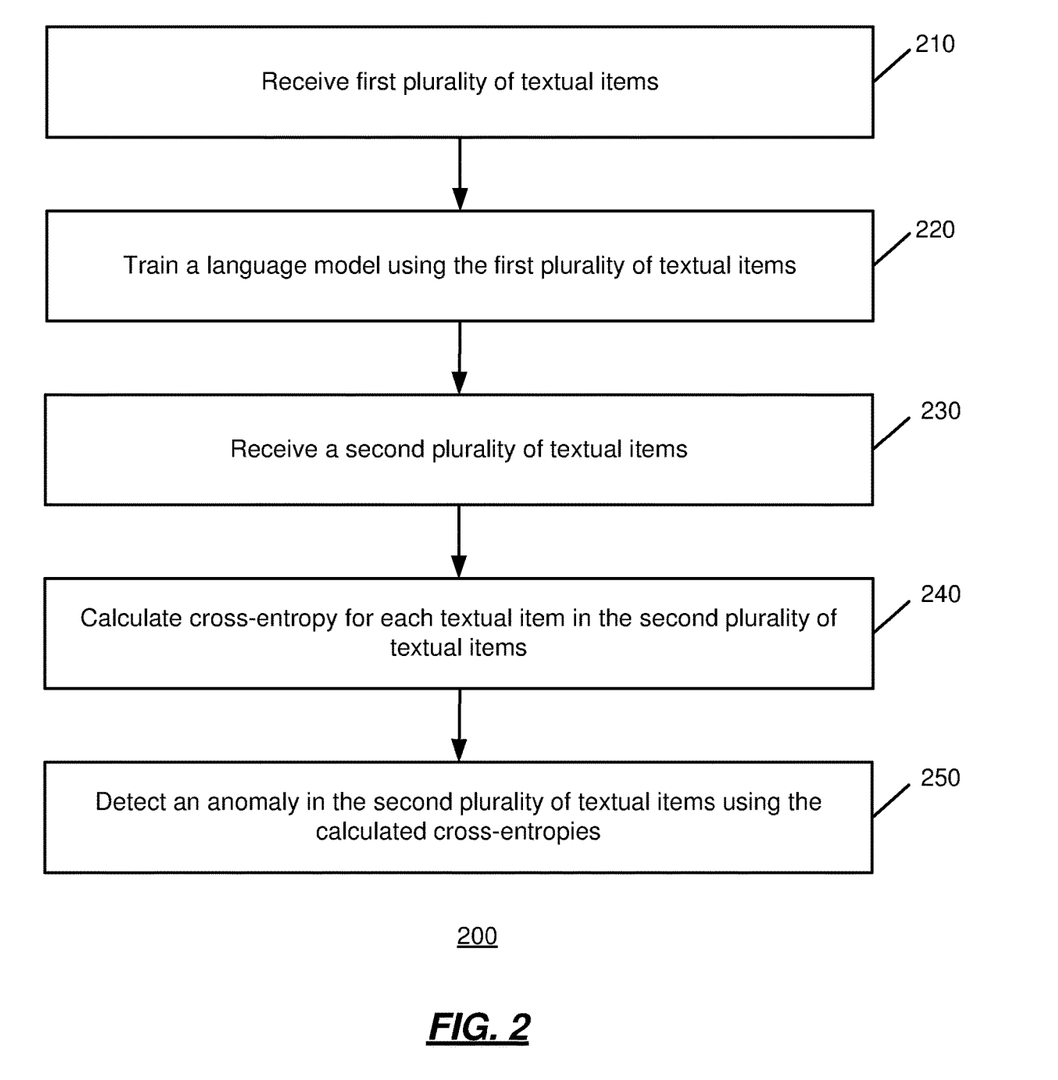
FIG. 2 is an illustration of an exemplary method for detecting anomalies in textual items.

FIG. 2 is an illustration of an exemplary method for detecting anomalies in textual items. The method 200 may be implemented by the anomaly detector 110.

At 210, a first plurality of textual items is received. The first plurality of textual items 105 may be received by the language engine 120. The first plurality of textual items 105 may correspond to messages in a social networking application, sentences, words, and phrases spoken in a conversation between an agent and a customer, or text from a chat between an agent and a customer. Other text may be supported.

At 220, a language model is trained using the first plurality of textual items. The language model 125 may be trained using the first plurality of textual items 105 by the language engine 120. Any method for training a language model 125 may be used. Depending on the embodiment, the language model 125 may include a plurality of words and phrases from the first plurality of textual items 105 along with a frequency for each of the words and phrases in the first plurality of textual items 105. Any method for training a language model 125 may be used.

At 230, a second plurality of textual items 105 is received. The textual items 105 in the second plurality of textual items 105 may be received by the cross-entropy engine 130. The second plurality of textual items 105 may be a time series of textual items 105 received after the textual items 105 of the first plurality of textual items 105.

At 240, a cross-entropy is calculated for the textual items in the second plurality of textual items. The cross-entropies 135 may be calculated by the cross-entropy engine 130 using the language model 125. Any method of or calculating the cross-entropy 135 of a textual item 105 using a language model 125 may be used.

In some embodiments, the cross-entropy engine 130 may calculate a cross-entropy 135 for a textual item 105 using all of the words of the associated textual item 105. Alternatively, the cross-entropy engine 130 may calculate the cross-entropy 135 using only the first c number of words, where c is set by a user or administrator.

Depending on the embodiment, the cross-entropy engine 130 may calculate cross-entropies 135 of the second plurality of textual items 105 until a number of textual items 105 that exceeds a number and/or time threshold since the language model 125 was updated or slid is received. Alternatively, the cross-entropy engine 130 may calculate cross-entropies 135 of the second plurality of textual items 105 until a perplexity of the language model 125 exceeds a threshold perplexity. After any of the thresholds are exceeded, the cross-entropy engine 130 may provide the calculated cross-entropies 135.

At 250, an anomaly is detected in the second plurality of textual items 105. The anomaly may be detected by the detection engine 140. Depending on the embodiment, an anomaly may be detected when the cross-entropy 135 for a textual item 105 exceeds a threshold. The threshold may be set by a user or an administrator and may depend on the type of textual items 105 being considered.

Figure 3:
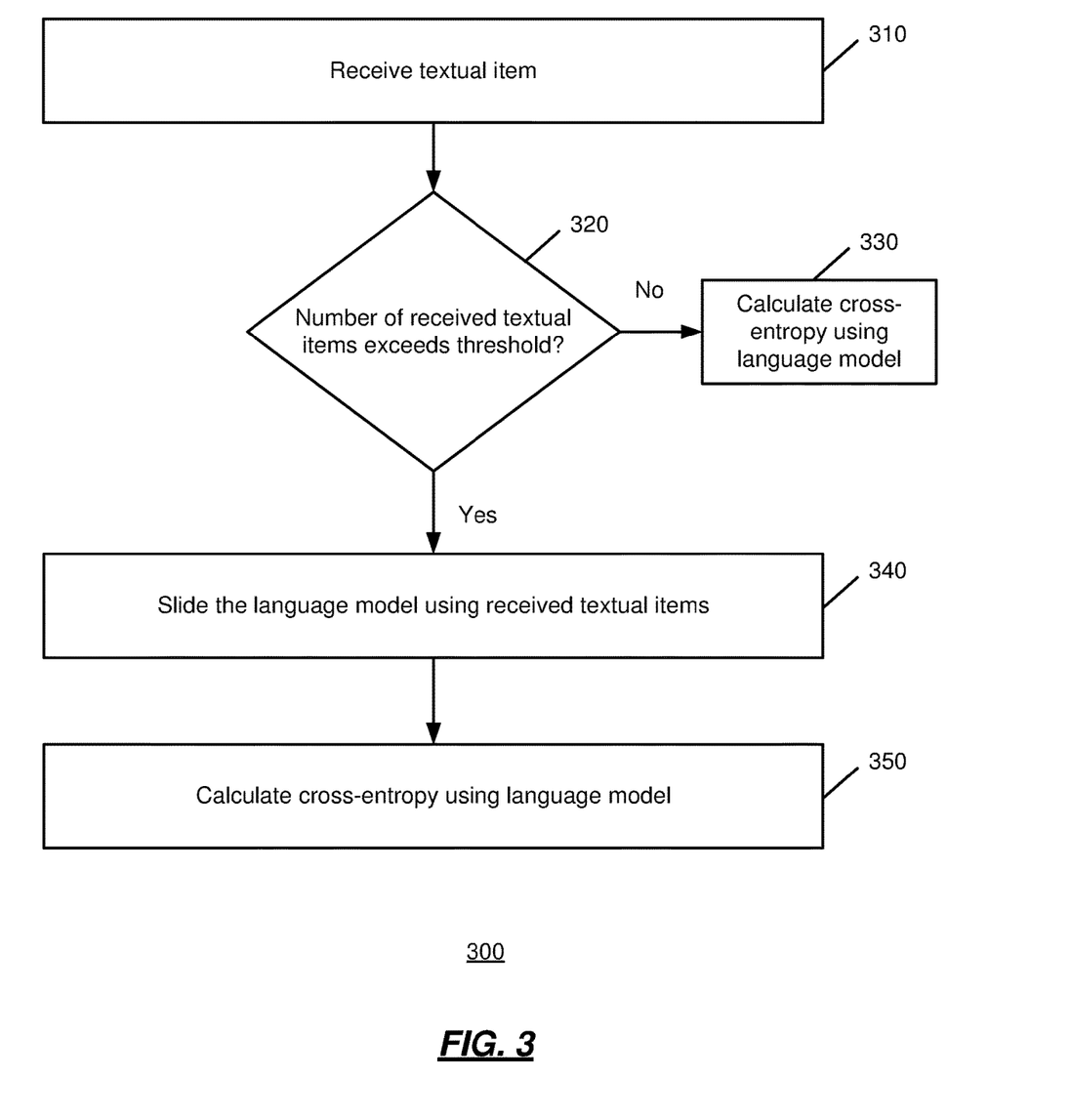
FIG. 3 is an illustration of an exemplary method for detecting anomalies in textual items using a fixed sized crawling model.

FIG. 3 is an illustration of an exemplary method for detecting anomalies in textual items 105 using a fixed sized crawling model. The method 300 may be implemented by the anomaly detector 110.

At 310, a textual item is received. The textual item 105 may be received by the cross-entropy engine 130. The textual item 105 may include a plurality of words and may be part of a time series of textual items 105. The textual item 105 may be a line of text spoken by a customer to an agent or provided to an agent in a chat session.

At 320, whether a number of received textual items exceeds a threshold is determined. The determination may be made by the cross-entropy engine 130. The cross-entropy engine 130 may keep a count of the number of textual items 105 that have been processed since the language model 125 was generated and/or was last slid. The threshold may be set by a user or an administrator. Depending on the embodiment, the threshold may be a time threshold (e.g., how much time has passed since the language model 125 was last slid).

If the number of received textual items does not exceed the threshold, the method 300 may continue at 330 where the cross-entropy 135 for the textual item 105 may be calculated by the cross-entropy engine 130 using the language model 125. Else, the method 300 may continue at 340.

At 340, the language model is slid using the textual items 105. The language model 125 may be slid by the language engine 120 using all of the textual items 105 that were received since the last time the language model 125 was either slid or generated. Any method for sliding a language model 125 may be used.

At 350, the cross-entropy of the received textual item is calculated. The cross-entropy 135 may be calculated by the cross-entropy engine 130 using the updated language model 125. Depending on the embodiment, after sliding the language model 125, the cross-entropy engine 130 may provide the cross-entropies 135 calculated for textual items 105 calculated after the language model 125 was previously generated or slid. Alternatively or additionally, the cross-entropy engine 130 may return the average cross-entropy 135 value for the textual items 105.

Figure 4:
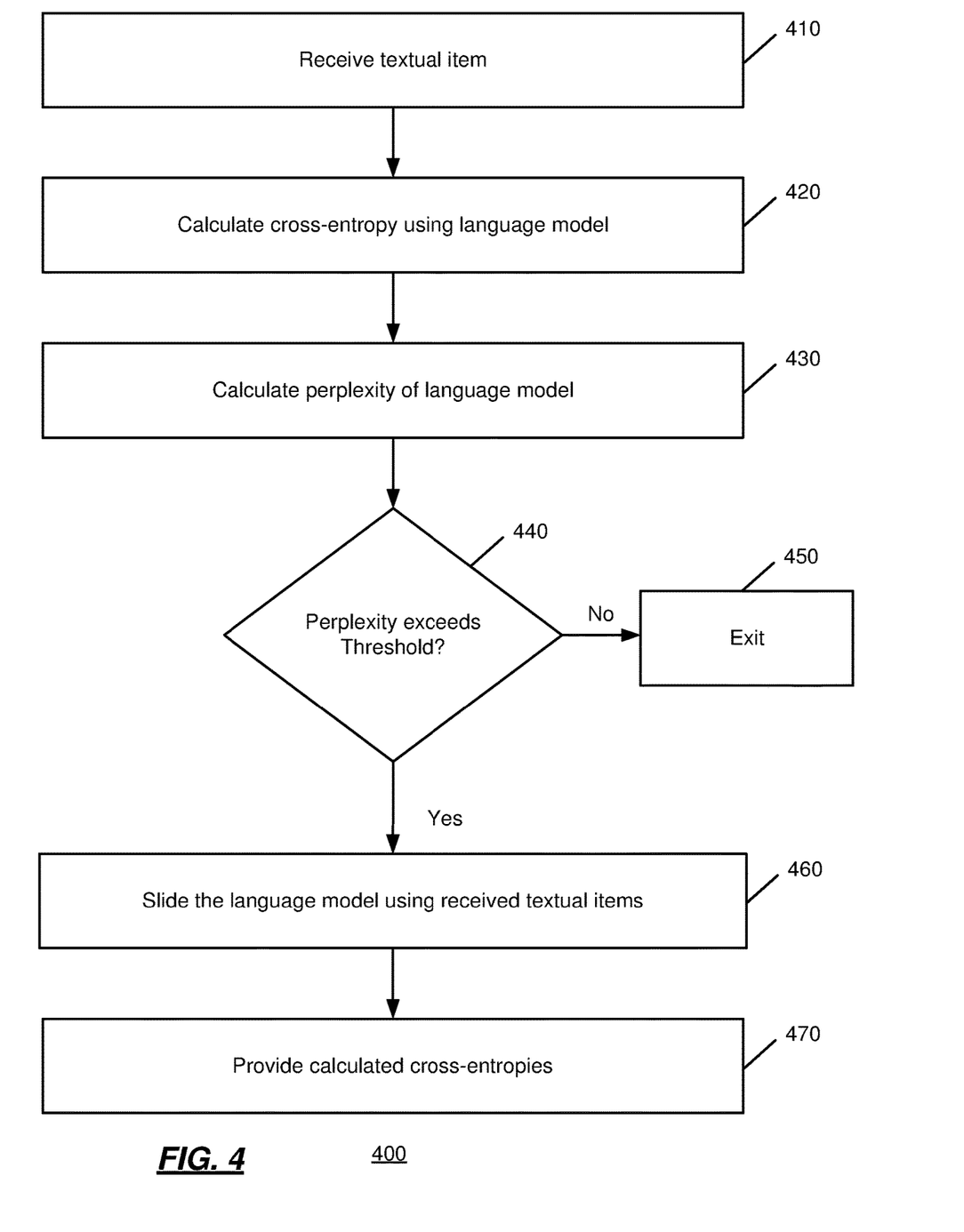
FIG. 4 is an illustration of an exemplary method for detecting anomalies in textual items using an adaptive size crawling model.

FIG. 4 is an illustration of an exemplary method for detecting anomalies in textual items 105 using an adaptive size crawling model. The method 400 may be implemented by the anomaly detector 110.

At 410, a textual item is received. The textual item 105 may be received by the cross-entropy engine 130. The textual item 105 may include a plurality of words and may be part of a time series of textual items 105.

At 420, the cross-entropy for the textual item is calculated. The cross-entropy 135 may be calculated by the cross-entropy engine 130 using the language model 125. Depending on the embodiment, the cross-entropy 135 may be calculated using the entire textual item 105, or just a subset of words from the textual item 105.

At 430, the perplexity of the language model is calculated. The perplexity of the language model 125 may be calculated by the language engine 120. Any method for calculating the perplexity of a language model 125 may be used.

At 440, whether the perplexity exceeds a threshold is determined. The determination may be made by the language engine 120. The threshold perplexity may be set by the user or administrator. If the perplexity of the language model 125 does not exceed the threshold, then the method 400 may exit at 450 and may consider a next received textual item 105. Else, the method 400 may continue at 460.

At 460, the language model is slid using the textual items 105. The language model 125 may be slid by the language engine 120 using all of the textual items 105 that were received since the last time the language model 125 was either slid or generated. Any method for sliding a language model 125 may be used.

At 470, the calculated cross-entropies are provided. The cross-entropies 135 may be provided by the cross-entropy engine 130. The provided cross-entropies 135 may be the cross-entropies 135 created since the language model 125 was last slid or updated.

Figure 5:
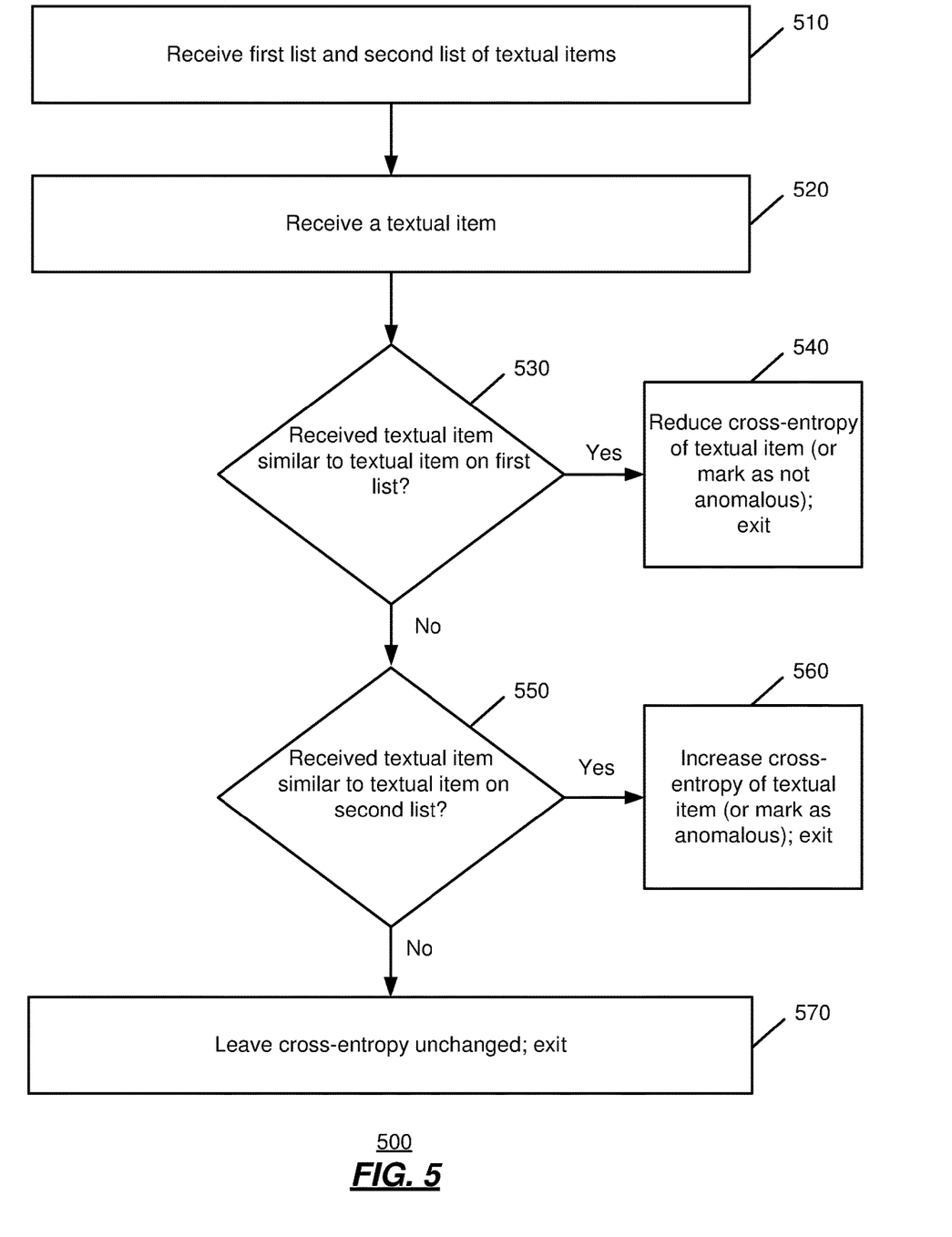
FIG. 5 is an illustration of an exemplary method for detecting anomalies in textual items that includes feedback from one or more annotators.

FIG. 5 is an illustration of an exemplary method for detecting anomalies in textual items 105 that includes feedback from one or more annotators. The method 500 may be implemented by the anomaly detector 110.

At 510, a first list of textual items and a second list of textual items is received. The first and second lists may be received by the feedback engine 150. The first list 143 may include indications of textual items 105 that were indicated to not be anomalies by one or more annotators. The second list 147 may include indications of textual items 105 that were indicated to be anomalies by the one or more annotators.

At 520, a textual item is received. The textual item 105 may be received by the feedback engine 150. The textual item 105 may be associated with a time-series of textual items 105 whose cross-entropies 135 were calculated by the cross-entropy engine 140.

At 530, whether the received textual item is similar to a textual item on the first list of textual items is determined. The determination may be made by the feedback engine 150 calculating the similarity of the received textual item 105 with respect to each textual item 105 on the first list 143. A suitable similarity function is the equation 3 described above. Other similarity functions may be used. The required degree or threshold similarity for a pair of textual items 105 to be considered similar may be set by a user or administrator. If the received textual item 105 is determined to be similar to a textual item 105 on the first list 143, the method 500 may continue at 540. Else, the method 500 may continue at 550.

At 540, the cross-entropy of the received textual item 105 is reduced. The cross-entropy 135 may be reduced by the feedback engine 150. The amount that the cross-entropy is reduced by may be set by a user or administrator.

Alternatively, the feedback engine 150 may mark the received textual item 105 as not anomalous. Accordingly, the textual item 105 will not be found to be associated with an anomaly regardless of its associated cross-entropy 135. After either reducing the cross-entropy 135, or marking the received textual item 105 as not being an anomaly, the method 500 may exit.

At 550, whether the received textual item is similar to a textual item on the second list of textual items is determined. The determination may be made by the feedback engine 150 calculating the similarity of the received textual item 105 with respect to each textual item 105 on the second list 147. If the received textual item 105 is determined to be similar to a textual item 105 on the second list 147, the method 500 may continue at 560. Else, the method 500 may continue at 570.

At 560, the cross-entropy of the received textual item 105 is increased. The cross-entropy 135 may be increased by the feedback engine 150. The amount that the cross-entropy is increased by may be set by a user or administrator.

Alternatively, the feedback engine 150 may mark the received textual item 105 as anomalous. Accordingly, the textual item 105 will be found to be associated with an anomaly regardless of its associated cross-entropy 135. After either increasing the cross-entropy 135, or marking the received textual item 105 as being an anomaly, the method 500 may exit.

At 570, the cross-entropy associated with the received textual item 105 is unchanged. The method 500 may then consider the similarity of a next textual item 105 in the time series with respect to the textual items 105 on the list 143.

Figure 6:
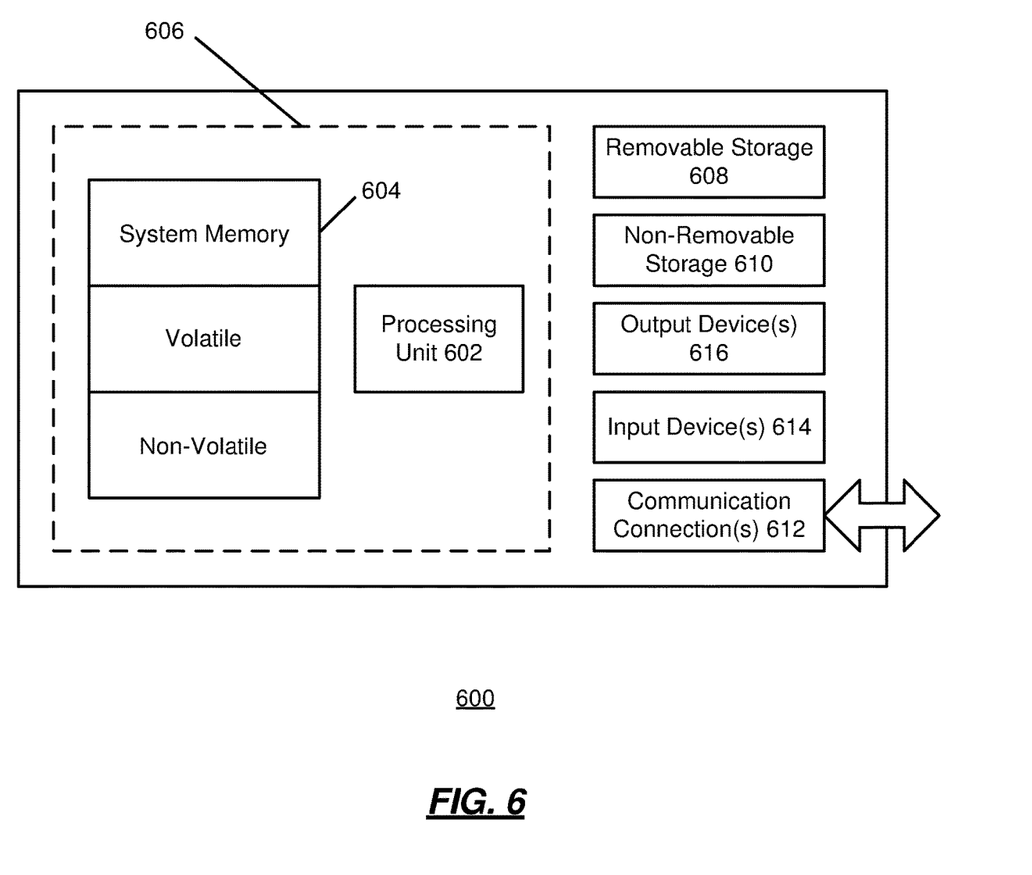
FIG. 6 shows an exemplary computing environment in which example embodiments and aspects may be implemented.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting anomalies in textual items comprising:
   receiving a first plurality of textual items by a computing device;
   training a non-parametric language model using the received first plurality of textual items by the computing device;
   after training the non-parametric language model, receiving a second plurality of textual items by the computing device from an intelligent virtual assistant, wherein the second plurality of textual items comprises a transcript of an interaction between the intelligent virtual assistant and a customer, in a call center;
   calculating a cross-entropy for each textual item in the second plurality of textual items by the computing device using the non-parametric language model;
   detecting an anomaly in at least one of the textual items of the second plurality of textual items by the computing device using the calculated cross-entropies;
   determining an intent of the interaction based on the detected anomaly by the computing device;
   determining that a number of textual items in the second plurality of textual items exceeds a first threshold by the computing device;
   sliding the non-parametric language model forward using the second plurality of textual items by the computing device in response to determining that the number of textual items in the second plurality of textual items exceeds the first threshold;
   formulating a response to the customer based on the determined intent by the computing device; and
   returning the response to the intelligent virtual assistant by the computing device.

2. The method of claim 1, further comprising:
   determining that an amount of time has passed since the non-parametric language model was last slid forward exceeds a second threshold; and
   sliding the non-parametric language model forward using the second plurality of textual items in response to determining that the amount of time has passed since the non-parametric language model was last slid forward exceeds the second threshold.

3. The method of claim 1, wherein a textual item comprises a plurality of words.

4. The method of claim 3, wherein calculating the cross-entropy for each textual item in the second plurality of textual items comprises calculating the cross-entropy using a subset of the plurality of words of the textual item.

5. The method of claim 1, wherein calculating the cross-entropy for each textual item in the second plurality of textual items comprises calculating an average cross-entropy for each textual item in the second plurality of textual items.

6. The method of claim 1, further comprising:
   receiving a list of textual items that were determined not to be associated with anomalies;
   for each textual item of the second plurality of textual items:
      determining if the textual item is in the list of textual items; and
      if the textual item is in the list of textual items, reducing the calculated cross-entropy for the textual item.

7. The method of claim 6, wherein determining if the textual item is in the list of textual items comprises determining if the textual item is similar to a textual item in the list of textual items.

8. A method for detecting anomalies in textual items comprising:
   receiving a first plurality of textual items by a computing device;
   training a non-parametric language model using the received first plurality of textual items by the computing device;
   after training the non-parametric language model, receiving a second plurality of textual items by the computing device from an intelligent virtual assistant, wherein the second plurality of textual items comprises a transcript of an interaction between the intelligent virtual assistant and a customer, in a call center;
   for each textual item of the second plurality of textual items:
      calculating a cross-entropy for the textual item using the non-parametric language model by the computing device;
      calculating a perplexity of the non-parametric language model by the computing device; and
      if the calculated perplexity exceeds a threshold, sliding the non-parametric language model forward using a subset of the textual items of the second plurality of textual items by the computing device;
   detecting an anomaly in at least one textual item of the second plurality of textual items by the computing device using the calculated cross-entropies;
   determining an intent of the interaction based on the detected anomaly by the computing device;
   determining that a number of textual items in the second plurality of textual items exceeds a threshold by the computing device;
   sliding the non-parametric language model forward using the second plurality of textual items by the computing device in response to determining that the number of textual items in the second plurality of textual items exceeds the threshold;
   formulating a response to the customer based on the determined intent by the computing device; and
   returning the response to the intelligent virtual assistant by the computing device.

9. The method of claim 8, wherein a textual item comprises a plurality of words.

10. The method of claim 8, wherein calculating the cross-entropy for the textual item comprises calculating the cross-entropy using a subset of a plurality of words of the textual item.

11. The method of claim 8, wherein calculating the cross-entropy for the textual item comprises calculating an average cross-entropy.

12. The method of claim 8, further comprising:
receiving a list of textual items that were determined not to be associated with anomalies;
for each textual item of the second plurality of textual items:
determining if the textual item is in the list of textual items; and
if the textual item is in the list of textual items, reducing the calculated cross-entropy for the textual item.

13. A system for detecting anomalies in textual items comprising:
at least one processor; and
a memory storing instructions that when executed by the at least one processor cause the at least one processor to:
receive a first plurality of textual items;
train a non-parametric language model using the received first plurality of textual items;
after training the non-parametric language model, receive a second plurality of textual items from an intelligent virtual assistant, wherein the second plurality of textual items comprises a transcript of an interaction between the intelligent virtual assistant and a customer, in a call center;
calculate a cross-entropy for each textual item in the second plurality of textual items using the non-parametric language model;
detect an anomaly in at least one of the textual items of the second plurality of textual items using the calculated cross-entropies;
determine an intent of the interaction based on the detected anomaly;
determine that a number of textual items in the second plurality of textual items exceeds a first threshold;
slide the non-parametric language model forward using the second plurality of textual items in response to determining that the number of textual items in the second plurality of textual items exceeds the first threshold;
formulate a response to the customer based on the determined intent; and
return the response to the intelligent virtual assistant.

14. The system of claim 13, wherein the instructions further comprise instructions that when executed by the at least one processor cause the at least one processor to:
determine that an amount of time has passed since the non-parametric language model was last slid forward exceeds a second threshold; and
slide the non-parametric language model forward using the second plurality of textual items in response to determining that the amount of time has passed since the non-parametric language model was last slid forward exceeds a second threshold.

15. The system of claim 13, wherein a textual item comprises a plurality of words.

* * * * *